US00RE34928E

United States Patent [19]

Highfield

[11] E Patent Number: Re. 34,928

[45] Reissued Date of Patent: May 2, 1995

[54] SCREW THREADED FASTENERS

[75] Inventor: Anthony M. Highfield, Madeley, England

[73] Assignee: P.S.M. International PLC, West Midlands, England

[21] Appl. No.: 905,545

[22] Filed: Jun. 25, 1992

Related U.S. Patent Documents

Reissue of:

[64] Patent No.: 4,941,788
Issued: Jul. 17, 1990
Appl. No.: 358,127
Filed: May 30, 1989

[30] Foreign Application Priority Data

Aug. 3, 1988 [GB] United Kingdom ..... 8818414

[51] Int. Cl.[6] ..... F16B 37/00

[52] U.S. Cl. ..... 411/178; 411/180; 411/453

[58] Field of Search ..... 411/178, 180, 453, 456, 411/513, 530, 451, 452, 455, 412, 413, 509, 510, 504–506; D8/382, 385, 397

[56] References Cited

U.S. PATENT DOCUMENTS

| | | | |
|---|---|---|---|
| D. 287,820 | 1/1987 | Bullen et al. | D8/385 |
| D. 323,287 | 1/1992 | Brunetti | D8/385 |
| D. 323,288 | 1/1992 | Brunetti | D8/385 |
| 475,407 | 5/1892 | Marsh | 411/453 |
| 1,022,106 | 4/1912 | Murphy | 411/455 X |
| 3,129,444 | 4/1964 | Kahn | 411/180 X |
| 3,130,503 | 4/1964 | Rosan | 411/180 X |
| 3,242,962 | 3/1966 | Dupree | 411/180 |
| 3,727,254 | 4/1973 | Tildesley | 411/180 X |
| 4,046,181 | 9/1977 | Barnsdale | 411/455 X |
| 4,818,165 | 4/1989 | Shirai | 411/178 |
| 4,842,462 | 6/1989 | Tildesley | 411/180 |

FOREIGN PATENT DOCUMENTS

| | | | |
|---|---|---|---|
| 2055272 | 7/1971 | Germany . | |
| 54443 | 11/1911 | Switzerland | 411/456 |
| 0000885 | 4/1861 | United Kingdom | 411/456 |
| 0844644 | 8/1960 | United Kingdom | 411/453 |
| 1279452 | 6/1972 | United Kingdom | 411/180 |
| 1314061 | 4/1973 | United Kingdom | 411/178 |
| 2039660 | 8/1980 | United Kingdom . | |

OTHER PUBLICATIONS

Dodge Heli-Coil Designer's Manual; ©1984.
Thermosonics Corp. advertisement circa 1985 of Symmetrisert II.
Modern Plastics Jun. 1988, p. 355; advertisement of UNISERT.

*Primary Examiner*—Lloyd A. Gall
*Attorney, Agent, or Firm*—Learman & McCulloch

[57] ABSTRACT

A screw threaded insert to be installed in for example thermoplastic material by ultrasonic vibrations applied to the insert is double-ended and comprises a main helically ribbed portion separated from a minor portion formed with teeth or projections aligned with helical ribs, and a pilot portion. The pilot portion is to locate the insert in a performed bore in the required orientation of insertion, the toothed portion displaces material in complementary grooves, so as to facilitate travel of the insert into the material and ensure good filling of the inter-rib spaces.

11 Claims, 1 Drawing Sheet

SCREW THREADED FASTENERS

Figure 1:
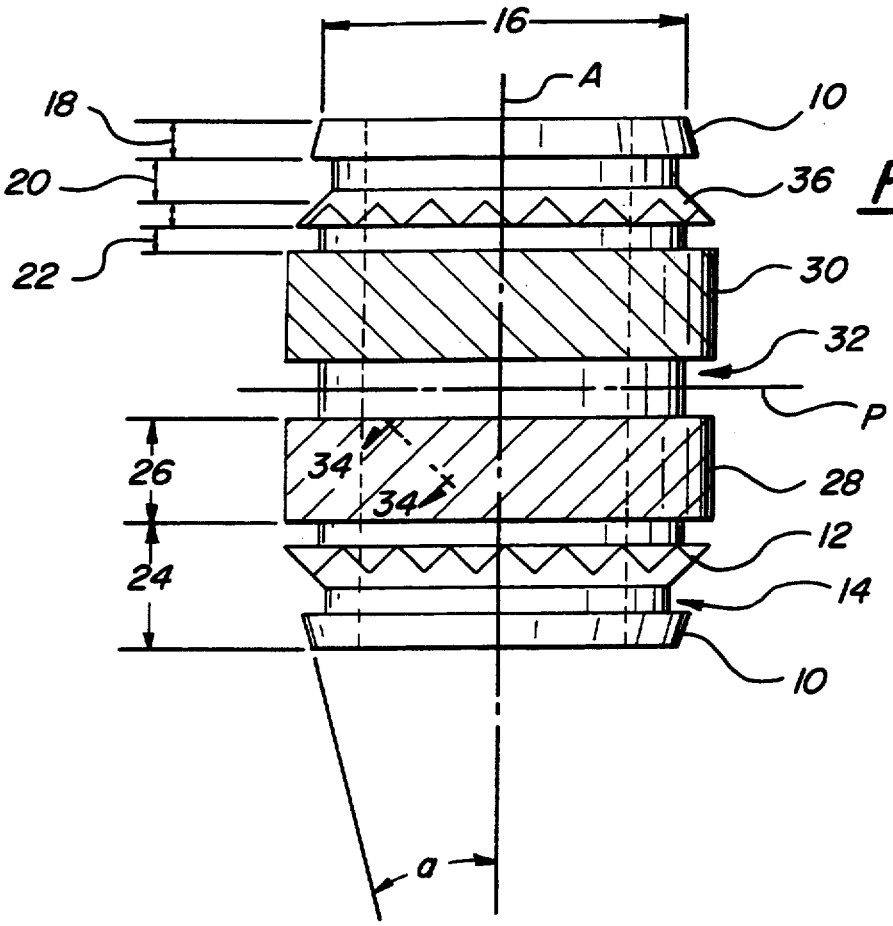

Matter enclosed in heavy brackets [ ] appears in the original patent but forms no part of this reissue specification; matter printed in italics indicates the additions made by reissue.

BACKGROUND

This invention relates to screw threaded fasteners of the kind known in the trade as inserts which are primarily intended to be pressed into objects made of synthetic resinous materials e.g. with the aid of ultrasonic vibrations applied to the fasteners. This causes the material to flow locally. A pilot bore is provided in the object, and the insert has a pilot portion at one end which is received in the bore and serves to locate and position the fastener as it begins the installation movement.

United Kingdom Patent 1279452 is a well known example of a fastener of this kind, having two axially spaced generally cylindrical bands separated from one another and from the pilot by peripheral grooves, and the two bands are each provided with helically extending teeth or ribs of sawtooth configuration which may be produced for example by knurling. The two sets are of opposite hand, i.e. one set spiral clockwise towards the pilot and the other set anticlockwise. The roots of the teeth, i.e. the minimum diameter at the base of the intertooth grooves, may be approximately equal to the diameter of the pilot and of the peripheral groove between the two bands.

During installation, the object material is displaced by the teeth and flows to fill, partly or wholly, the intertooth grooves and the peripheral grooves. This serves to provide axial and angular hold against pull-out and torque loads.

United Kingdom Patent 2039660 shows one fastener generally similar to that in United Kingdom Patent 1279452, and another which is double-ended in having pilot portion at each end. These fasteners are modified to suit insertion methods using heat as well as or instead of ultrasonic vibrations. That is to say such a fastener may be ultrasonically inserted or heat inserted.

The double-ended form is especially suitable for automatic installation from bowl feeders in which the fasteners are shaken out to process along a track to the installation point, because it avoids the necessity for orientation means to ensure that the pilot portion leads rather than trails. However it has been found experimentally that the double-ended ones will only accept lower loads. The object of the invention is to provide an improved higher load bearing double-ended fastener.

SUMMARY

According to the invention a double-ended fastener is symmetrical about a mid-point on its longitudinal axis, has a pilot portion at each end, an encircling groove next to each pilot portion, a minor toothed portion next to said groove, a second like groove next to said minor toothed portion, and a major toothed portion next to said second groove and extending towards said mid-point.

In design situations where there is no torque load or the angular screw-out forces are known in terms of direction, the two major toothed portions may be parts of a single toothed band extending over the major part of the length of the fastener. Typically the teeth will then be a righthand set spiralling clockwise away from the viewed end of the fastener. Then, force applied for example to a screw engaged with a female screwthread in the bore of the fastener will tend to force the insert further into the material. This is usually acceptable and in fact prevented by the object which has a blind bore to receive the fastener.

In other situations there may be two major bands separated by a central main peripheral groove and then the two bands will be toothed of opposite hand.

Preferably the pilots are frusto-conical with the smaller end of the frusto cone at the fastener end, and of a shallow angle of conicity, for example 15 deg. to the longitudinal axis.

Preferably the minor bands are of a steeper angle of conicity for example 45 deg. The large diameter ends of the minor bands, adjacent to the major band(s) may be of like diameter to the major bands. Preferably also the teeth are formed by knurling operations and in manufacture the knurling wheels are traversed across the major and adjacent minor bands in the same direction in such case and this can produce pointed teeth on the minor bands aligned helically with the splined teeth on the major bands. It is thought that these teeth may be responsible for ensuring particularly good fill of the peripheral grooves and thus particularly good performance in relation to what is theoretically possible from any particular design.

The grooves nearest the fasteners ends may be of smaller diameter than the small diameter of the pilots: the other two or three grooves may be of the same diameter as the small end of the pilots.

A suitable order to dimensions is for the axial length of the pilot, minor band and both adjacent grooves each to be generally similar to one another, and the total of the four dimensions to be similar to that of the major band, where two major bands are provided, or of half the length of the major band where there is only one.

DRAWINGS

Both versions are illustrated in the accompanying informal drawings wherein:

FIG. 1 is an elevation of one fastener and

FIG. 2 of another.

DESCRIPTION

Turning now to FIG. 1, the fastener therein illustrated is of generally circular cross section over the whole of its length. It is symmetrical about a plane P which is normal to the axis A. Each end is provided with a pilot portion 10 which is of shallow frustoconicity, the angle alpha being of the order of 15 deg. The pilot portion is separated from an adjacent toothed band 12,36, by a peripheral groove 14,20. The groove is of smaller diameter than the dimension 16 at the small end of the frusto-conical pilot portion. The axial dimension of 10,12,14,18,20,22 and 36 are all approximately similar to one another. The total axial dimension 24 is approximately equal to the axial dimension 26 of a major toothed portion. The two toothed portions shown as 28 and 30 on FIG. 1 are separated by the groove 32.

Figure 2:
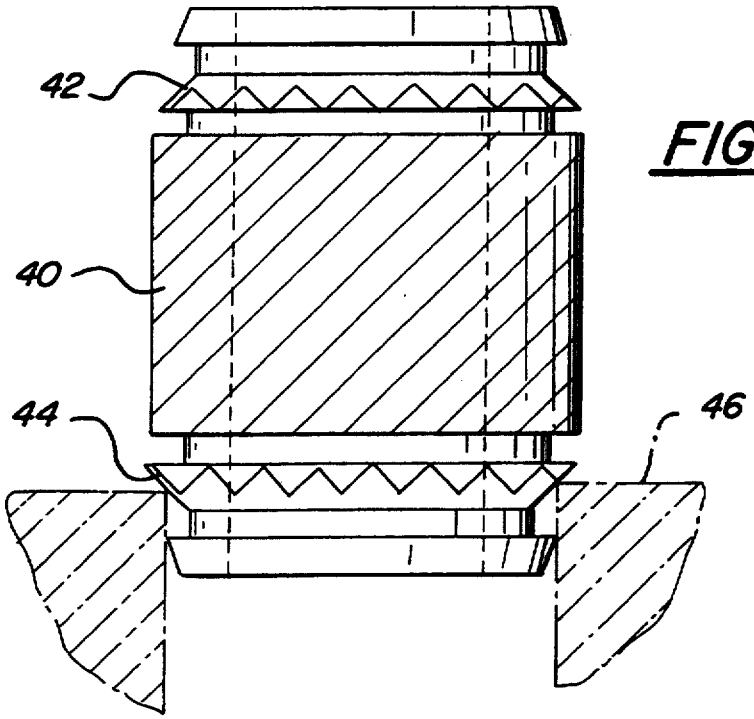

It will be understood that the fastener of FIG. 1 has a female screwthreaded bore to provide an anchorage for a screw, and that bore and it screw-thread extends continuously through the whole of the length of the insert. *The bore is shown in dash lines in FIGS. 1 and 2.*

The band 28 is helically ribbed or toothed so that in section on the line 34—34 normal to the length of the ribs it is of sawtooth configuration with possibly symmetrically related flanks. Those teeth or ribs are aligned with comparable teeth on the band 12. Conveniently, in manufacturing the fastener, a knurl wheel is employed after forming the insert to its profile, and the wheel contacts the area of the band 28 and the band 12 so as to form both sets of teeth or ribs simultaneously. This alignment of the teeth on the two bands is thought to be important in installation as more particularly explained herein. Because the band 12 is frusto-conical, the teeth formed thereon are not continuously helically extending ribs as they are on the band 28, but are more of the nature of pyramidal individual teeth generally radiating from the fastener.

In the case of the band 30 and its adjacent band 36 at the opposite end of the fastener to the band 28 its adjacent band 12, exactly the same applies except that the band 30 is helically ribbed in opposite direction of helix angle, but again the teeth on the band 36 are aligned with those on the band 30 as they were between the band 28 and the band 12. Again the teeth on the band 30 and those on the band 36 are formed with a single knurling operation across the two so that the teeth are aligned with the ribs.

The fastener shown in FIG. 2 differs only from that in FIG. 1 in that a single central band 40 is provided with the spirally extending ribs which are aligned with the teeth in the bands 42 44 and again produced by a single pass of knurling wheel.

In installation, the fastener is inserted into a prepared and usually blind hole in the for example thermoplastic workpiece, and the typical workpiece arrangement is illustrated in broken lines in FIG. 2. It will be seen that the maximum diameter of the frusto-conical inserted pilot is a close fit in the bore of the performed hole and the frusto-conical band 44 (in this case) rests on the rim of the hole so as to support the fastener so that its axis is aligned and co-extensive with the axis of the hole. The fastener is then pressed into the workpiece with accompanying ultrasonic vibrations applied, so as to cause the thermoplastic material to flow. The effectively individual spur-like teeth on the band 44, due to the frusto-conical shape immediately begin to create channels or grooves in the plastics body, and as the adjacent end of the main toothed band 40 encounters the face 46 of the body, the ribs or teeth on the part 40 automatically align with those channels. The helix angle causes the insert to rotate, which is permitted by the installation apparatus, so that effectively the insert "screws itself" into the wokrpiece.

The material displaced from the channels flows into the intertooth spaces and into rib spaces on the various parts of the fastener and further flows into the peripheral grooves. The hardened or re-set material, after the fluidising force such as the vibrations or heat is removed grips and embraces the fastener providing resistance to pull-out and screw-out torque loads.

A generally similar procedure is followed in the case of the FIG. 1 fastener during installation, except that in this case, the entry of the second band 30 into the material results in a series of ribs or opposite helicity which results in the cutting of fresh channels extending transversely in relation to the already existing channels left by the progression of the helix band 28. It is believed that there is a particular tendency for this to be resisted by the material which is of only limited fluidity, and this encourages filling of the central groove 32 in this embodiment, thus providing improved pull-out resistance in the installed fastener. However when the groove 32 is substantially completely filled, the displacement caused by the ribs on the band 30 ensures at least part-filling of the inter-rib channels on that part and at least part-filling of the following peripheral grooves. It will be appreciated in this case, the resistance to turning in both directions is provided by the oppositely angled helix teeth.

I claim:

1. A double ended fastener which is symmetrical about a mid-point on its longitudinal axis, comprising:

(a) a pilot portion at each end;

(b) an encircling groove next to each pilot portion;

(c) a minor toothed portion next to said groove *and having helical teeth*;

(d) a second like groove next to said minor toothed portion; and (e) a major toothed portion next to said second groove and extending towards said mid-point, *said major toothed portion having helical teeth,* the fastener having a female screw-threaded bore provided over the whole of its length.

2. A fastener as claimed in claim 1 wherein a pair of major toothed portions are provided which are symmetrically located with respect to said mid-point, and are separated by a peripheral encircling groove.

3. A fastener as claimed in claim 2 wherein said major toothed portions are helically ribbed in opposite directions of helix angle.

4. A fastener as claimed in claim 2 wherein the encircling groove at the mid-point has a diameter which is substantially the same as a diameter of the encircling groove between the major toothed portion and the minor toothed portion.

5. A fastener as claimed in claim 1 wherein each minor toothed portion is frusto-conical with the minor dimension of the frusto-cone located towards the adjacent end of the fastener and the major dimension adjacent said major toothed portion.

6. A fastener as claimed in claim 1 wherein each pilot portion is frusto-conical with the minor dimension of the frusto-cone located at the extreme end of the fastener and the major dimension adjacent said minor toothed portion.

7. A fastener as claimed in claim 6 wherein the minor dimension of each pilot portion greater than the diameter of the adjacent encircling groove and the diameter of the latter is substantially equal to the minor dimension of the frusto-conical minor toothed portion.

8. A double-ended fastener which is symmetrical about a midpoint on its longitudinal axis, comprising:

(a) a pilot portion at each end;

(b) an encircling groove next to each pilot portion;

(c) a minor toothed portion next to said groove;

(d) a second like groove next to said minor toothed portion; and (e) a pair of major toothed portions which are symmetrically located with respect to said midpoint and are separated by a peripheral encircling groove, wherein the encircling groove at the midpoint has a diameter which is substantially the same as the diameter of the encircling groove between the major toothed portion and the minor toothed portion.

[9. A double-ended fastener which is symmetrical in profile about a midpoint on its longitudinal axis, the fastener comprising:

(a) a pilot portion at each end;

(b) an encircling groove next to each pilot portion;

(c) a minor toothed portion next to each encircling groove;

(d) a second like groove next to each minor toothed portion; and (e) a major toothed portion extending between the second grooves and symmetrical in profile about the midpoint, the fastener having a female screw-threaded bore provided over the whole of its length.]

[10. A fastener as claimed in claim 9 wherein said major toothed portion is helically ribbed.]

*11. A double ended fastener which is symmetrical in profile about a midpoint on its longitudinal axis, said fastener comprising:*

*(a) a pilot portion at each end of said fastener;*

*(b) an encircling groove next to each of said pilot portions;*

*(c) a minor toothed portion next to each of said grooves, each of said minor toothed portions having helical teeth;*

*(d) a second encircling groove next to each of said minor toothed portions;*

*(e) a major toothed portion between said second grooves, said major toothed portion having helical teeth, the helix of the teeth of each of said minor toothed portions extending in the same direction as the helix of the teeth of the adjacent major toothed portion and the teeth of each of said minor toothed portions being helically aligned with the teeth of the adjacent major toothed portion; and*

*(f) an internal screw-threaded bore extending over the whole of the length of said fastener.*

*12. A double-ended fastener which is symmetrical about a midpoint on its longitudinal axis; said fastener comprising:*

*(a) a pilot portion at each end of said fastener;*

*(b) an encircling groove next to each of said pilot portions;*

*(c) a minor toothed portion next to each of said grooves, each of said minor toothed portions having helical teeth;*

*(d) a second encircling groove next to each of said minor toothed portions;*

*(e) a pair of major toothed portions provided between said second grooves and separated by another encircling groove, each of said major toothed portions having helical teeth; and*

*(f) an internal screw-threaded bore extending over the whole of the length of said fastener.*

*13. A double-ended fastener which is symmetrical about a midpoint on its longitudinal axis, said fastener comprising:*

*(a) a pilot portion at each end of said fastener;*

*(b) an encircling groove next to each of said pilot portions;*

*(c) a minor toothed portion next to each of said grooves, each of said minor toothed portions having helical teeth;*

*(d) a second encircling groove next to each of said minor toothed portions;*

*(e) a pair of major toothed portions provided between said second grooves and separated by another encircling groove, each of said major toothed portions having helical teeth, the helix of the teeth of the major toothed portions extending in opposite directions, the helix of the teeth of each minor toothed portion extending in the same direction as the helix of the teeth of the respective adjacent major toothed portion, and the teeth of each minor toothed portion being helically aligned with the teeth of the respective adjacent major toothed portion; and*

*(f) an internal screw-threaded bore extending between the ends of said fastener.*

* * * * *